Oct. 6, 1953 F. A. RAPPLEYEA 2,654,549
FIBER GLASS SPOOL
Filed Oct. 27, 1949
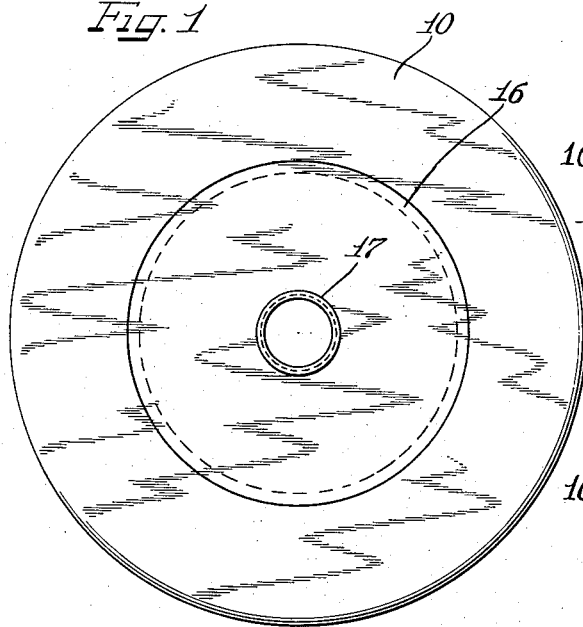
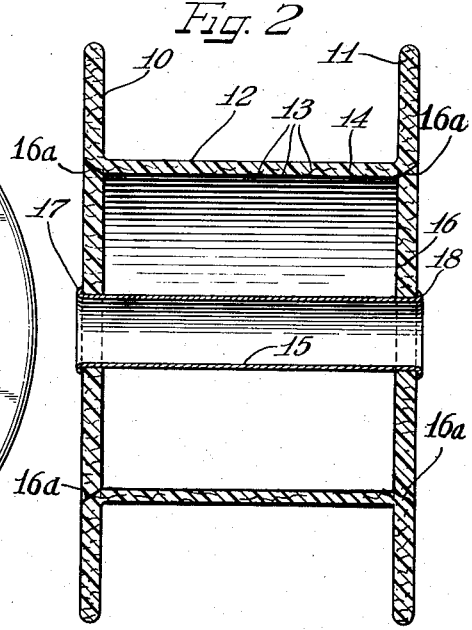
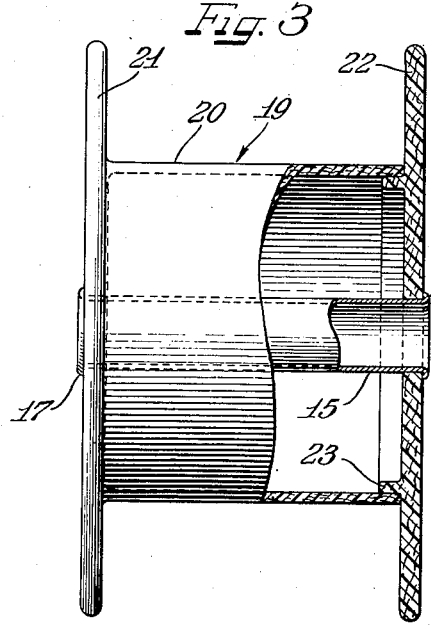
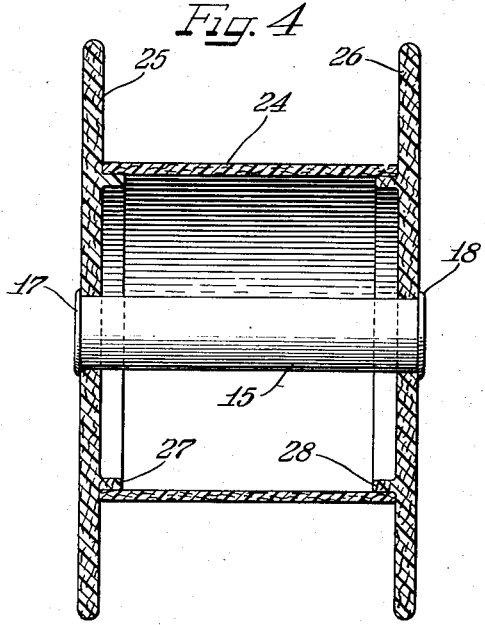
Inventor
Frederick A. Rappleyea
by
Attys Patented Oct. 6, 1953

2,654,549

UNITED STATES PATENT OFFICE 2,654,549

FIBER GLASS SPOOL

Frederick A. Rappleyea, Oak Park, Ill., assignor to Hubbard Spool Company, Chicago, Ill., a corporation of Illinois Application October 27, 1949, Serial No. 123,827

4 Claims. (Cl. 242—119)

The present invention relates to a spool assembly.

More particularly, the present invention relates to a spool assembly having remarkable physical properties such as resistance to impact, high strength and a low coefficient of thermal expansion. In addition, the spools of the present invention may be fabricated in a convenient manner to very close tolerances and high degrees of concentricity.

The most common spools in use for winding wire and the like are metallic spools composed of sheet metal or the like reinforced at appropriate places to give the assembly added strength. This strength is necessary to withstand the stresses involved as the wire is being wound on the spool at the extremely high rate of speed at which winding mechanisms operate. For example, flanges on spool assemblies are often subjected to thrust loads as high as 700 pounds, or greater, during such winding. This thrust often results in deformation of the flanges of the spool so that proper operation of the spool assembly is impaired.

In addition to the sheet metal spools previously mentioned, some attempts have been made to produce a spool from synthetic plastic material, for example, thermoplastic resins. This type of spool has been found unusable due to the fact that the thermoplastic resins generally have the undesirable characteristic of cold flow; that is, they have a tendency under applied loads or stresses to change their dimensions even without the application of heat and thereby become permanently deformed. In addition to the property of cold flow, the thermoplastic resins have a relatively low distortion point and cannot be subjected to even slight increases in temperature without warping or other deformation.

An object of the present invention is to provide a spool assembly of relatively light weight and yet possessing extremely desirable characteristics of strength and resistance to impact.

A further object of the present invention is to provide a spool assembly having a high degree of accuracy and concentricity of surface.

A further object of the invention is to provide a spool assembly having a continuous surface, i. e., one in which no crack appears between the hub and head portions of the spool.

A still further object of the invention is to provide a spool assembly which can be produced in a variety of colors or mixture of colors to thereby enhance the sales appeal of the spool.

As a feature of the present invention I have herein provided a spool assembly consisting of a body of glass fibers bonded by a cured thermosetting resin composition.

In a preferred embodiment of the present invention, the thermosetting resin to be used is a resin of the polyester type. This general class of resin has been found extremely suitable as a binding material for glass fibers in preparing the spool assembly.

The polyester resins are well known in the art and normally comprise the polymerized condensation products of an acid such as maleic acid, fumaric acid or phthalic acid with an alcohol or glycol such as allyl alcohol, ethylene glycol or diethylene glycol, with or without the addition of unsaturated hydrocarbons such as styrene and cyclopentadiene. The polyesters are formed by the reaction of the glycol or unsaturated alcohol with a dibasic acid such as maleic acid, resulting in the formation of a long chain polymer containing a large number of ester groups in a cross-linked structure. A long chain polyester of this type is generally known as an alkyd resin. It is common practice commercially to include with the polyester of the type mentioned a solvent liquid such as an unsaturated hydrocarbon liquid which not only acts as a solvent but enters into the copolymerization reaction and ester formation.

One characteristic of the polyester resins which distinguishes them from conventional thermosetting resins is the fact that the reaction by which they are cured does not liberate water. It is possible that this fact permits the resin to be cured into a coherent form without resulting in brittleness.

Compositions formed from glass fibers combined with the polyester type resins have remarkable physical properties. For example, a spool 6" in diameter having a 3½" hub and a 3½" traverse was subjected to a fracture test. It was found that such a spool was capable of withstanding a tension load of 2400 to 4500 pounds without noticeable fracture when the load was applied to each flange, simulating actual operating conditions when wound with wire.

Another characteristic of the spools of the present invention is their extremely high modulus of elasticity. The modulus of elasticity of glass fibers per se is in the vicinity of 5,000,000 pounds per square inch. The modulus of the fibers bonded with the polyester type resin is in the vicinity of 3,500,000 pounds per square inch.

Another distinctive feature of the spools of the present invention is the fact that they may be formed by a simple molding operation to close tolerances in the neighborhood of 0.002 inch. The spools are also characterized by a continuity of surface, that is, no crack appears between the head and hub portions thereof. In addition, since the spools can be manufactured with such close tolerances, a high degree of concentricity can be obtained. This is extremely vital where the spools are used in high speed machines, since any tendency of the spools to rotate on any but their true geometric axes will cause wobbling which is very apt to break the wire as it is being wound or unwound.

Another distinctive feature of the spool composition of the present invention lies in its ability to withstand high temperatures without deformation. The distortion point of the composition is in the vicinity of 400° F. and, even at this temperature, no permanent deformation takes place.

A rather unique feature of the resin compositions described lies in their compatability with various pigments. Thus, spools may be produced having any color identified with a particular manufacture, or sections of the spools may be provided with different colored pigments to easily identify the spools both with respect to the manufacture and with respect to the wire size carried by the spool.

The drawings show several modifications of various constructions which could be employed within the scope of the present invention.

On the drawings:

Figure 1 is a plan view of a spool construction;

Figure 2 illustrates a preferred form wherein the hub and flange portions of the spool are formed of one continuous body;

Figure 3 shows a modified form of spool construction comprising a two-piece spool assembly;

Figure 4 is a further modified form of spool construction comprising a three-piece assembly.

As shown on the drawings:

The spool assembly shown in Figures 1 and 2 represents one of the preferred embodiments of the present invention in which the head portions 10 and 11, as well as the hub portion 12, comprise a body of glass fibers 13 bonded by a cured thermosetting resin 14. An end plug 16 of the same composition as the hub and flange portion is secured to the hub portion 12 by cementing the beveled edges 16a thereto. Within the end plug 16 there is provided a tubular insert 15, usually of metal, which is held thereby by means of annular end flanges 17 and 18 suitably formed by an upsetting or spinning operation to overlie the end plugs 16.

The embodiment shown in Figure 3 includes a body section 19 comprising an integral hub 20 and head portion 21. A separately formed cooperating head portion 22 having the same composition as the body section 19 is united thereto by means of an inwardly extending annular flange 23 which fits within the open end of the hub 20 and is secured to the interior of the hub 20 by means of a suitable adhesive.

In the embodiment shown in Figure 4, the spool is formed from a separately molded hollow cylindrical hub portion 24 and a pair of head portions 25 and 26. Annular ridges 27 and 28 on the respective head portions fit within and are secured to the hub portion 24.

The following description relates to the method involved in forming the spool construction of the present invention and also represents a preferred means for carrying out the same. In the initial step the glass fibers are formed into the configuration of a spool assembly as by providing mats of glass fibers in superimposed relationship to form the configuration desired. However, a more desirable manner for carrying out this preforming step is to provide a primary core such as a wire screen in the configuration of the spool and depositing uniformly a layer of glass fibers over the screen by evacuating the chamber in which the screen is located and into which the fibers are introduced. Next, a liquid binder material is added to the preformed core in small amounts to cause adjoining glass fibers to adhere to each other. One suitable binding resin is the type known commercially as the "Plaskon" binder, containing a urea-formaldehyde resin.

After the binder has been applied to the glass fiber structure, the material is cured in an oven at a temperature of approximately 300° F. for a time of less than 5 minutes, and normally on the order of 1½ minutes. This primary curing stage is carried out at substantially atmospheric pressure. After such a curing stage, the resulting mixture containing the glass fibers and solidified binder is placed in a suitable mold assembly for the introduction of the resin. In the case where the glass fibers are deposited upon the wire screen, the screen is removed before the introduction of the assembly into the mold.

The composition which is applied to the fiber glass binder composite is prepared by mixing the thermosetting polyester resin in liquid form with a catalyst, a plasticizer, fillers and suitable pigments to form a "resin mix." The polyester resin may be of the type known commercially as "Laminar" or Selectron No. 5003 resin (an addition type copolymer resulting from the reaction between a dibasic acid, maleic anhydride, ethylene glycol, and styrene). The preferred catalyst is benzoyl peroxide, and the plasticizers which find use in this connection are of the type that include tricresyl phosphate, dibutyl phthalate, glycol diacetate, triacetin, and the like. The amount of catalyst and plasticizer to be added should be controlled within the rather close limits of from 1½ to 3% by weight of the resin mix.

In addition to catalyst-plasticizer combination, a suitable pigment is incorporated into the resin composition prior to the coating. The pigment comprises from 1½ to 3% by weight of resin mix. These pigments normally contain inhibitors which affect the action of the catalyst, and consequently the proportions of the catalyst-plasticizer mixture to the pigment will be dependent to some measure on the particular pigments used and the percentage of catalysts present.

The resin mix also contains from about 15 to 30% by weight of fillers such as diatomaceous earth, magnesium carbonate, or asbestos. A rag filler may also be used, but not with necessarily equivalent results.

The resin mix containing the resin, catalyst-plasticizer, pigment and filler is then sprayed, painted or otherwise uniformly deposited upon the pre-formed glass fiber core. The amount of resin mix added will be in the range from 55 to 70% by weight of the finished spool so that the glass fibers will constitute from 45 to 30% by weight of the whole composition. For example, in preparing a one-pound spool, five ounces of glass fibers will be used together with about eleven ounces of resin mix. The impregnation will normally be carried out while the fibers are disposed within a die in which the curing step is to be carried out. The die to be used is preferably a parting type die consisting of two symmetrical members hinged along their longitudinal axis and having means for adjusting the pressure on the material contained in the die cavities.

The die is closed and subjected to a curing operation at a temperature of 150° to 250° F. for a period of one to ten minutes and under superatmospheric pressure, normally on the order of 25 to 150 pounds per square inch. The resulting spool structure has a very smooth surface with no surface irregularities such as blow holes being present. The material is lightweight, has a continuous surface, and has the remarkable physical properties previously disclosed.

From the foregoing it will be apparent to those skilled in the art that I have herein provided a novel spool construction having physical properties comparable with and in many cases exceeding similar properties of sheet metal spools.

It will be understood that modifications and variations may be effected without departing from the scope of the novel concepts of the present invention.

I claim as my invention:

1. A spool construction comprising an integral body defining a smooth-surfaced hub and a pair of continuous smooth-surfaced head portions, an end plug secured at each end of said body, said end plugs and said body each consisting of 55-70% of a thermoset polyester resin matrix having embedded therein 30-45% of matted glass fibers reinforcing said matrix and completely enclosed and bound together thereby, and a tubular rigid metal insert carried by said end plugs and extending coaxially of said hub.

2. A spool construction comprising an integral body defining a smooth-surfaced hub and a continuous smooth-surfaced head portion at one end thereof, a second smooth-surfaced head portion secured at the opposite end thereof and matingly engaged therewith to define a continuous surface, annular end walls secured at opposite ends of said hub, and a tubular rigid metal insert positioned coaxially of said hub and concentrically of said end walls and carried by said end walls; said body, second head portion and end walls each consisting of 55-70% of thermoset polyester resin matrix having embedded therein 30-45% of matted glass fibers reinforcing said matrix and completely enclosed and bound together thereby.

3. A spool construction comprising an integral body defining a smooth-surfaced hub and a continuous smooth-surfaced head portion and end wall at one end thereof, a second smooth-surfaced head portion and end wall integral therewith secured at the opposite end of said hub and matingly engaged therewith to define a continuous surface, and a tubular rigid metal insert carried by said end walls and extending coaxially of said hub; said body and said second head portion each consisting of 55-70% of a thermoset polyester resin matrix having embedded therein 30-45% of matted glass fibers reinforcing said matrix and completely enclosed and bound together thereby.

4. A spool construction comprising an integral body defining a smooth-surfaced hub and a continuous smooth-surfaced head portion at one end thereof, a second smooth-surfaced head portion secured at the opposite end thereof and matingly engaged therewith to define a continuous surface, annular end walls secured at opposite ends of said hub, and a tubular rigid metal insert positioned coaxially of said hub and extending concentrically through each end wall and flared back against the outside of each end wall to secure the same in position; said body, second head portion and end walls each consisting of 55-70% of a thermoset polyester resin matrix having embedded therein 30-45% of matted glass fibers reinforcing said matrix and completely enclosed and bound together thereby.

FREDERICK A. RAPPLEYEA.

References Cited in the file of this patent

UNITED STATES PATENTS

| Number | Name | Date |
|---|---|---|
| 1,589,177 | Kendall | June 15, 1926 |
| 1,934,167 | Crooks | Nov. 7, 1933 |
| 1,981,771 | Benge | Nov. 20, 1934 |
| 2,414,125 | Rheinfrank | Jan. 14, 1947 |
| 2,467,999 | Stephens | Apr. 19, 1949 |
| 2,486,235 | Watt | Oct. 25, 1949 |
| 2,525,469 | Anderson | Oct. 10, 1950 |

FOREIGN PATENTS

| Number | Country | Date |
|---|---|---|
| 434,062 | Great Britain | Aug. 26, 1935 |
| 671,920 | France | Sept. 9, 1929 |

OTHER REFERENCES

Fiberglas Standards, PR 6, Cl, Apr. 1949, pp. 8, 9 and 11.

Fiberglas Standards, A 9.3.1, Dec. 23, 1947, pp. 3-18 and 25-35, Owens Corning Fiberglas Corporation, Toledo, Ohio.